United States Patent
Natori

(10) Patent No.: US 9,855,952 B2
(45) Date of Patent: Jan. 2, 2018

(54) CONTROL DEVICE FOR VEHICLE

(71) Applicant: TOYOTA JIDOSHA KABUSHIKI KAISHA, Toyota-shi, Aichi-ken (JP)

(72) Inventor: Akio Natori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/491,045

(22) Filed: Apr. 19, 2017

(65) Prior Publication Data

US 2017/0305429 A1 Oct. 26, 2017

(30) Foreign Application Priority Data

Apr. 21, 2016 (JP) .................. 2016-085268

(51) Int. Cl.
| | |
|---|---|
| *F16H 47/06* | (2006.01) |
| *B60W 30/188* | (2012.01) |
| *B60W 10/06* | (2006.01) |
| *B60W 10/107* | (2012.01) |

(52) U.S. Cl.
CPC ........ *B60W 30/1886* (2013.01); *B60W 10/06* (2013.01); *B60W 10/107* (2013.01); *B60W 2510/0233* (2013.01); *B60W 2510/30* (2013.01); *B60W 2710/0644* (2013.01); *B60W 2710/0661* (2013.01); *B60W 2710/1005* (2013.01); *B60Y 2306/09* (2013.01)

(58) Field of Classification Search
CPC .......... B60W 30/1886; B60W 10/107; B60W 10/06; B60W 2710/1005; B60W 2710/0661; B60W 2710/0644; B60W 2510/30; B60W 2510/0233; B60Y 2306/09
See application file for complete search history.

(56) References Cited

U.S. PATENT DOCUMENTS

| | | | |
|---|---|---|---|
| 2006/0166783 A1* | 7/2006 | Tamai | F02N 11/14 477/7 |
| 2007/0213151 A1* | 9/2007 | Usoro | B60K 6/485 474/87 |
| 2011/0118077 A1* | 5/2011 | Kawasaki | B60K 6/445 477/3 |

FOREIGN PATENT DOCUMENTS

JP 2015-214260 A 12/2015

* cited by examiner

*Primary Examiner* — David J Hlavka
(74) *Attorney, Agent, or Firm* — Oliff PLC

(57) ABSTRACT

A control device for a vehicle is provided. The vehicle includes an engine, an accessory, a continuously variable transmission, and a lock-up clutch. The control device includes an electronic control unit. The electronic control unit is configured to: when the load state is less than a predetermined value, control the speed ratio of the continuously variable transmission and the rotational speed of the engine such that the rotational speed of the engine during engagement of the lock-up clutch is kept at a first rotational speed; and when the load state is greater than or equal to the predetermined value, control the speed ratio of the continuously variable transmission and the rotational speed of the engine such that the rotational speed of the engine during engagement of the lock-up clutch becomes a second rotational speed higher than the first rotational speed.

2 Claims, 3 Drawing Sheets

CONTROL DEVICE FOR VEHICLE

INCORPORATION BY REFERENCE

The disclosure of Japanese Patent Application No. 2016-085268 filed on Apr. 21, 2016 including the specification, drawings and abstract is incorporated herein by reference in its entirety.

BACKGROUND

1. Technical Field

The present disclosure relates to a control device for a vehicle and, in particular, relates to a control device for a vehicle including an engine, a continuously variable transmission (CVT), and a lock-up clutch.

2. Description of Related Art

As a transmission for a vehicle, there is conventionally known a continuously variable transmission (CVT) that can continuously change the speed ratio. In the vehicle equipped with the CVT, when the vehicle travels at a constant low vehicle speed in the state where an engine is operated in a low-rotation medium-load range, the CVT is controlled to maintain the output of the engine at a constant rotational speed. In this travel state, the driving force of the vehicle and the travel resistance of the vehicle are balanced, so that various components (fitting portions between a clutch drum and a separator, between a core plate and a hub, between a primary sheave and a carrier, etc.) of the CVT tend to be in a floating state.

In order to continue to travel at the constant low vehicle speed in the state where the engine is in the low-rotation medium-load range, the burning rate of fuel in the engine needs to be increased, but, then, rotation fluctuation and torque fluctuation tend to occur in the output of the engine. When these fluctuations are input to the CVT in the floating state, rattling noise occurs at the various components that are in the floating state.

As a conventional technique for suppressing the occurrence of rattling noise, for example, in Japanese Patent Application Publication No. 2015-214260 (JP 2015-214260 A), it is determined whether or not the state of a vehicle satisfies a rattling noise occurrence condition, and when the condition is satisfied, a CVT is controlled to increase the rotational speed of an engine so as to deviate the operating state of the engine from a low-rotation medium-load range, thereby suppressing the occurrence of rattling noise.

SUMMARY

In the conventional technique described above, while the occurrence of rattling noise is suppressed, since the rotational speed of the engine is increased by the control that avoids the low-rotation medium-load range, the fuel consumption of the vehicle degrades.

Incidentally, since the possibility is high that the engine is in the medium-load range during the operation of an air conditioner, where the load of accessories included in the vehicle becomes high, control is performed to increase the rotational speed of the engine constantly during the operation of the air conditioner in the conventional technique described above.

However, for example, depending on the season such as spring or fall, there is a case where the necessity for temperature adjustment is low and thus the accessory load during the operation of the air conditioner is low, and in that case, even when the air conditioner is operated, the output torque of the engine is in the low-load range, but not in the medium-load range, so that rattling noise does not occur. When the rotational speed of the engine is increased even in such a case as in the conventional technique, there is a possibility of degradation of the fuel consumption.

The present disclosure provides a control device for a vehicle, that can not only suppress the occurrence of rattling noise, but also improve the fuel consumption of the vehicle.

A control device for a vehicle according to an aspect of the present disclosure is provided. The vehicle includes an engine, an accessory, a continuously variable transmission, and a lock-up clutch. The control device includes an electronic control unit. The electronic control unit is configured to: control a speed ratio of the continuously variable transmission and a rotational speed of the engine; determine a load state of the accessory; when the load state is less than a predetermined value, control the speed ratio of the continuously variable transmission and the rotational speed of the engine such that the rotational speed of the engine during engagement of the lock-up clutch is kept at a first rotational speed; and when the load state is greater than or equal to the predetermined value, control the speed ratio of the continuously variable transmission and the rotational speed of the engine such that the rotational speed of the engine during engagement of the lock-up clutch becomes a second rotational speed higher than the first rotational speed, thereby shifting an operating state of the engine to an operating state outside a low-rotation medium-load range.

In the control device according to the aspect described above, the electronic control unit may be configured to, when the load state has shifted between less than the predetermined value and greater than or equal to the predetermined value, control the speed ratio of the continuously variable transmission and the rotational speed of the engine such that the change rate of the rotational speed of the engine is suppressed within a predetermined range.

According to the control device of each of these aspects, when the load state of the accessory mounted on the vehicle is greater than or equal to the predetermined value, the control is performed such that the rotational speed of the engine becomes the second rotational speed higher than the first rotational speed. In this case, since the operating state of the engine is deviated from the low-rotation medium-load range by this control, the occurrence of rattling noise is suppressed.

On the other hand, when the load state of the accessory is less than the predetermined value, since the engine is not operated in the low-rotation medium-load range, rattling noise does not occur. In this case, the control is performed to keep the rotational speed of the engine at the first rotational speed, so that the fuel consumption of the vehicle is improved.

Therefore, according to the control device of the present disclosure, it is possible to suppress the occurrence of rattling noise and, at the same time, to improve the fuel consumption of the vehicle.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinbelow, an embodiment of the present disclosure will be described. This embodiment is a vehicle such as an automobile equipped with a continuously variable transmission (CVT), and this vehicle includes a vehicle control device to which the present disclosure is applied. The vehicle of this embodiment includes a transaxle-type automatic transmission (hereinafter referred to as a "transaxle") as a power transmission system. This transaxle is one that is installed in a transverse-engine FF (front-engine front-drive) vehicle or the like. The CVT is used as a transmission mechanism of the transaxle.

Figure 1:
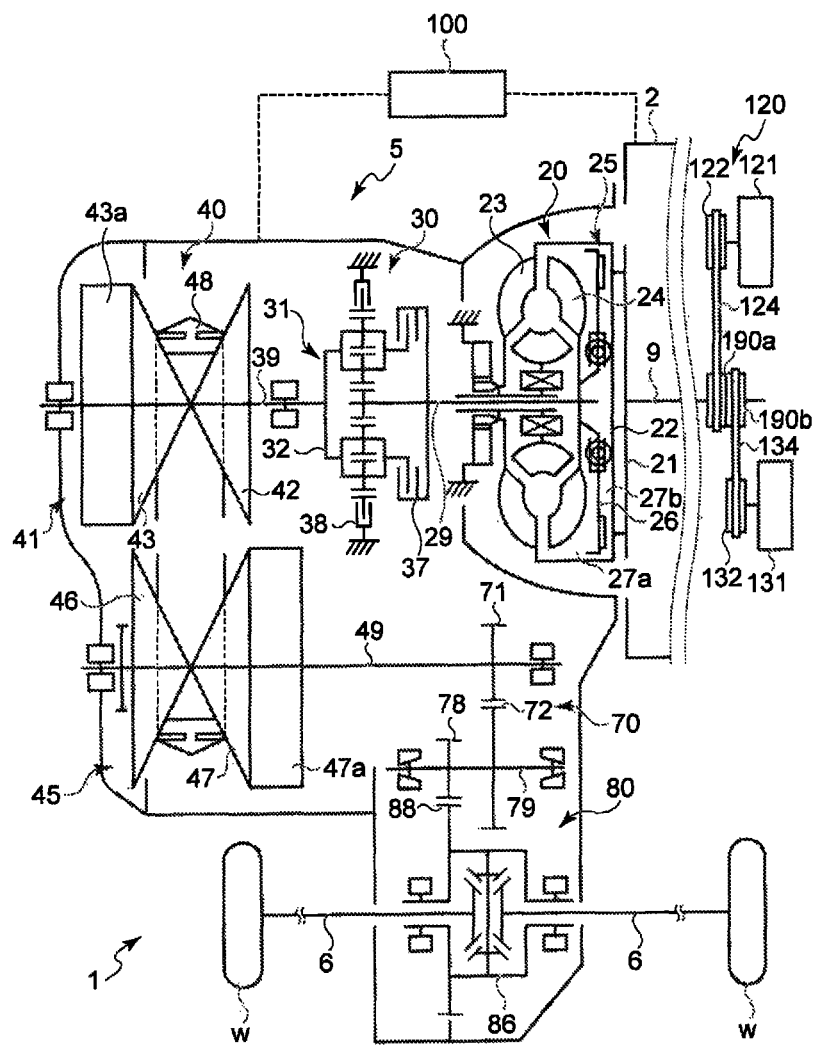
FIG. 1 is a skeleton diagram showing the configuration of a vehicle according to an embodiment of the present disclosure.

FIG. 1 is a skeleton diagram showing the configuration of the vehicle of this embodiment. FIG. 1 shows the configuration of the vehicle mainly with respect to the transaxle.

As shown in FIG. 1, a vehicle 1 of this embodiment includes an engine 2, a transaxle 5, drive shafts 6, and drive wheels W. The vehicle 1 further includes an electronic control unit 100, and an air conditioner 120 and an alternator (generator) 131 as accessories. The electronic control unit 100 is a vehicle control device to which the present disclosure is applied, and performs integrated control of the entire vehicle 1, but in this embodiment, the electronic control unit 100 performs control of particularly the engine 2 and a CVT 40.

The transaxle 5 is coupled to the engine 2, i.e. an internal combustion engine, serving as a prime mover. The transaxle 5 includes, in the order in which the power of the engine 2 is transmitted, a torque converter 20, a forward/reverse switching mechanism 30, the CVT 40 (transmission mechanism), a speed reduction mechanism 70, and a differential mechanism 80.

The torque converter 20 includes a drive plate 21 coupled to a crankshaft 9 serving as an output shaft of the engine 2, a pump impeller 23 coupled to the drive plate 21 via a front cover 22 connected to the drive plate 21, and a turbine runner 24 facing the pump impeller 23 and coupled to an input shaft 29. The torque converter 20, which is a slipping element, is provided with a lock-up clutch 25 that establishes direct coupling between the crankshaft 9 and the input shaft 29 for improving the transmission efficiency of the engine power.

The lock-up clutch 25 includes a clutch plate 26. The clutch plate 26 is coupled to the turbine runner 24 and disposed between the front cover 22 and the turbine runner 24. An apply chamber 27a is defined on the turbine runner 24 side of the clutch plate 26, while a release chamber 27b is defined on the front cover 22 side of the clutch plate 26. By supplying working oil into the apply chamber 27a and discharging working oil from the release chamber 27b, the clutch plate 26 is pressed against the front cover 22, so that the lock-up clutch 25 is in a completely engaged state to establish direct coupling between the crankshaft 9 and the input shaft 29. On the other hand, by supplying working oil into the release chamber 27b and discharging working oil from the apply chamber 27a, the clutch plate 26 is moved away from the front cover 22, so that the lock-up clutch 25 is in a released state to separate the crankshaft 9 and the input shaft 29 from each other. Alternatively, by adjusting the hydraulic pressures in the release chamber 27b and the apply chamber 27a, it is possible to control the lock-up clutch 25 to a slip lock-up state being an engaged state. By controlling the lock-up clutch 25 to this slip lock-up state, it is possible to hold the lock-up clutch 25 in a predetermined slip state, so that it is possible to maintain the difference in rotational speed between the crankshaft 9 and the input shaft 29 to be constant (e.g. 50 rpm).

The forward/reverse switching mechanism 30 includes a double-pinion type planetary gear train 31, a forward clutch 37, and a reverse brake 38. By controlling the forward clutch 37 and the reverse brake 38, the forward/reverse switching mechanism 30 can change the movable/immovable states of respective elements constituting the planetary gear train 31 so as to switch the engine power transmission path. The input shaft 29 and a primary shaft 39 are coupled to the planetary gear train 31. During vehicle forward travel, the forward/reverse switching mechanism 30 engages the forward clutch 37 and releases the reverse brake 38, thereby transmitting the rotation of the input shaft 29 as it is to the primary shaft 39 via the planetary gear train 31. On the other hand, during vehicle reverse travel, the forward/reverse switching mechanism 30 releases the forward clutch 37 and engages the reverse brake 38, thereby transmitting the rotation of the input shaft 29 to the primary shaft 39 in such a way that the rotation of the input shaft 29 is reversed via the planetary gear train 31.

The CVT 40 (transmission mechanism) includes a primary pulley 41 and a secondary pulley 45. The primary pulley 41 is provided on the primary shaft 39, while the secondary pulley 45 is provided on a secondary shaft 49. The primary pulley 41 is composed of a fixed sheave 42 and a movable sheave 43. The fixed sheave 42 and the movable sheave 43 face each other such that a generally V-shaped pulley groove is formed between the fixed sheave 42 and the movable sheave 43. A working oil chamber 43a is defined on the back side of the movable sheave 43. By adjusting the hydraulic pressure in the working oil chamber 43a, the width of the pulley groove of the primary pulley 41 can be changed. The secondary pulley 45 is composed of a fixed sheave 46 and a movable sheave 47. The fixed sheave 46 and the movable sheave 47 face each other such that a generally V-shaped pulley groove is formed between the fixed sheave 46 and the movable sheave 47. A working oil chamber 47a is defined on the back side of the movable sheave 47. By adjusting the hydraulic pressure in the working oil chamber 47a, the width of the pulley groove of the secondary pulley 45 can be changed. A transmission belt 48 is wound around the pulley groove of the primary pulley 41 and the pulley groove of the secondary pulley 45. By adjusting the hydraulic pressures in the working oil chambers 43a and 47a, respectively, the widths of the pulley grooves are changed such that the winding diameter of the transmission belt 48 changes continuously. As a result, the speed ratio of the CVT 40 is set to a desired value, and the power is transmitted from the primary pulley 41 to the secondary pulley 45 according to the set speed ratio. In this way, the continuously variable transmission from the primary shaft 39 to the secondary shaft 49 is made possible.

A speed reduction gear 71 is provided on the secondary shaft 49. The speed reduction gear 71 meshes with a driven-side speed reduction gear 72. The speed reduction mechanism 70 is constituted by the gears 71 and 72. The driven-side speed reduction gear 72 is provided on a shaft 79. Further, a final drive gear 78 is provided on the shaft 79 and meshes with a final driven gear (ring gear) 88 of the differential mechanism 80. With this configuration, the power transmitted from the secondary shaft 49 to the driven-side speed reduction gear 72 is transmitted to the final driven gear (ring gear) 88 via the shaft 79.

The differential mechanism 80 includes a differential case 86 configured to rotate integrally with the final driven gear (ring gear) 88. The drive shafts 6 have ends that are respectively coupled to left and right side gears housed in the differential case 86, while the drive wheels W are respectively attached to the other ends of the left and right drive shafts 6.

A crank pulley 190a is provided on the crankshaft 9 serving as the output shaft of the engine 2. The crank pulley 190a and a pulley 122 provided to a compressor 121 of the air conditioner 120 are connected to each other by a V-belt 124. When the engine 2 is rotated, the rotation thereof is transmitted to the compressor 121 via the V-belt 124, so that the compressor 121 is rotationally driven. By the driving of the compressor 121, the air conditioner 120 is operated to perform air conditioning in a compartment of the vehicle 1. A crank pulley 190b is further provided on the crankshaft 9. The crank pulley 190b and a pulley 132 provided to the alternator (generator) 131 are connected to each other by a V-belt 134. With this configuration, when the engine 2 is rotated, the alternator 131 to which the rotation of the engine 2 is transmitted via the V-belt 134 can generate electric power for supply to accessories, such as headlights, wipers, and electric power steering, not shown, which are mounted on the vehicle. The alternator 131 is a DC generator composed of an AC generator, a rectifier that converts three-phase AC current, generated by the AC generator, to DC current, and so on. By this power generation, the electric power for operation is supplied to the accessories, while a battery (e.g. a lead-acid battery), not shown, is charged, so that the generated electric power is stored in the battery.

In the continuously variable transmission (CVT) configured as described above, a cause of the occurrence of rattling noise is that when the driving force of the vehicle and the travel resistance of the vehicle are balanced to put the components of the CVT in a floating state in the state where the lock-up clutch is completely engaged during vehicle travel at a constant low vehicle speed, rotation fluctuation of the engine and torque fluctuation of the drive shafts are transmitted to the CVT to cause collisions between those components. Specifically, a cause of the occurrence of rattling noise is due to the occurrence of collisions between components at the following (1) to (3) portions. (1) a fitting portion between a clutch drum and a separator plate (neither shown) and a fitting portion between a clutch hub and a friction plate (neither shown), which constitute the forward clutch 37. (2) a fitting portion between the primary shaft 39 and the fixed sheave 42 of the primary pulley 41 that is spline-fitted to the primary shaft 39. (3) a fitting portion between the primary shaft 39 and a carrier 32 as the constituent element of the planetary gear train 31 that is spline-fitted to the primary shaft 39.

Next, the configuration of the electronic control unit 100 as the vehicle control device to which the present disclosure is applied will be described with reference to FIG. 2.

Figure 2:
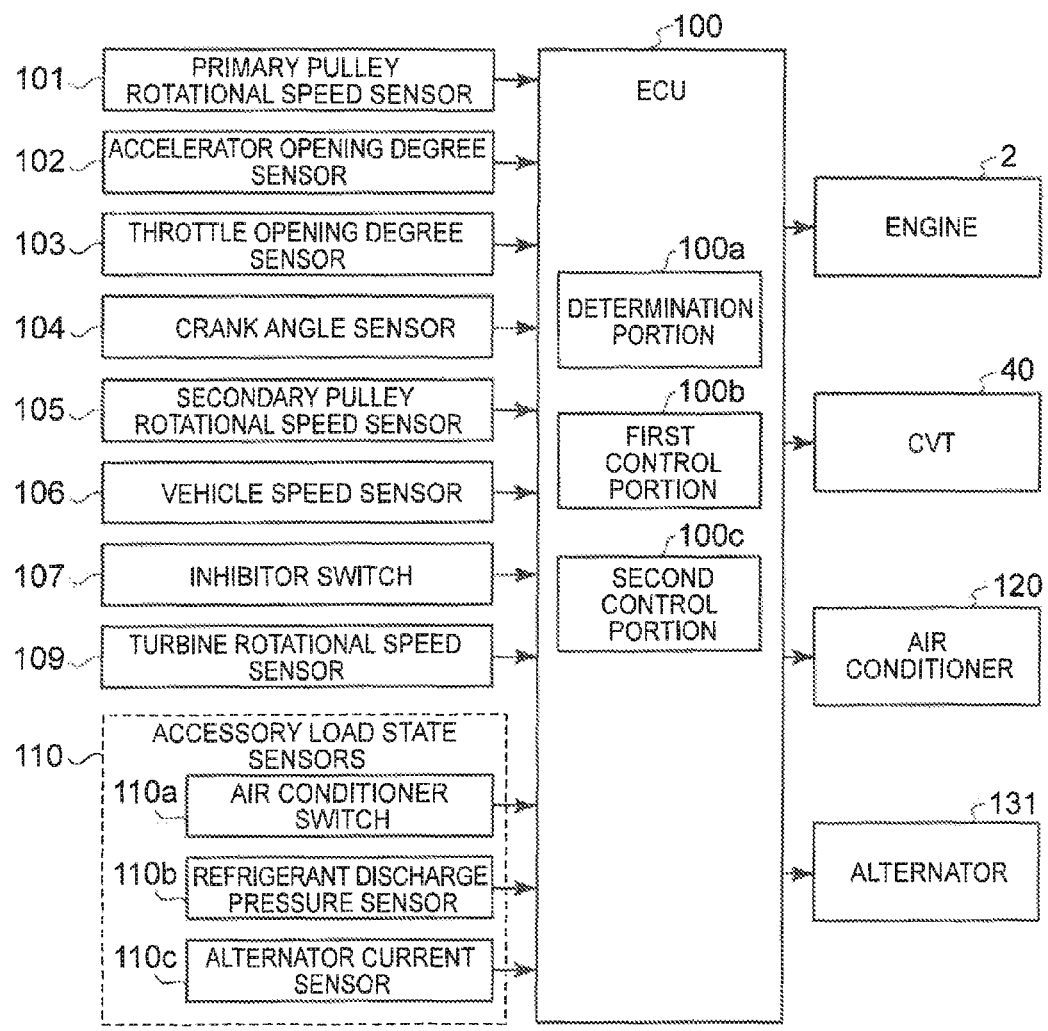
FIG. 2 is a configuration diagram of a control device for the vehicle, to which the present disclosure is applied.

In FIG. 2, the electronic control unit 100 includes a microprocessor (CPU), and a ROM, a RAM, and an I/O port (none shown) are connected to the CPU via a bus. Control programs, various map data, and so on are stored in the ROM. The CPU can obtain those stored information from the ROM via the bus. Calculation data and so on by the CPU are temporarily stored in the RAM. The CPU can access the RAM via the bus to store and obtain information such as calculation data. Detection signals indicative of vehicle states are input to the CPU via the I/O port from various sensors (not shown) mounted on the vehicle 1. By operating actuators (not shown) via the I/O port, the CPU can control the speed ratio of the CVT 40, the rotational speed of the engine 2, the engaged/released state of the lock-up clutch 25, and so on.

As sensors that are connected to the electronic control unit 100, the vehicle 1 is provided with a turbine rotational speed sensor 109 that detects a rotational speed of the input shaft 29 (a rotational speed of the turbine runner 24), a primary pulley rotational speed sensor 101 that detects a rotational speed of the primary pulley 41, and a secondary pulley rotational speed sensor 105 that detects a rotational speed of the secondary pulley 45. The vehicle 1 is further provided with an accelerator opening degree sensor 102 that detects an accelerator opening degree corresponding to a depression amount of an accelerator pedal, a throttle opening degree sensor 103 that detects a throttle opening degree of a throttle valve, a crank angle sensor 104 that detects an engine rotational speed, a vehicle speed sensor 106 that detects a vehicle speed, and a sensor 107 such as an inhibitor switch that detects an operating state of a select lever.

As sensors that are connected to the electronic control unit 100, the vehicle 1 is further provided with sensors for detecting an operating state and a load state of the air conditioner 120 as the accessory mounted on the vehicle, and with a sensor for detecting a load state of the alternator (generator) 131 as the accessory mounted on the vehicle. Specifically, there are provided an air conditioner switch 10a for detecting an ON/OFF state as an operating state of the air conditioner 120, a refrigerant discharge pressure sensor 110b for detecting a load state of the air conditioner 120, and an alternator current sensor 110c for detecting a load state of the alternator 131. When electric energy that is used by an accessory increases, electric energy that should be generated by an alternator also increases, so that the load (due to the power generation) also increases correspondingly. Since the output voltage of the alternator is determined in a certain range from the rating of the accessory and the charging voltage of a battery, the generated current increases in proportion to the load in that voltage range. Therefore, in this embodiment, an alternator load torque (i.e. a load torque due to the power generation that is applied to the engine by the alternator) is estimated based on a generated current of the alternator that is detected by the alternator current sensor 110c, thereby determining a load state of the alternator 131 from the estimated value of load torque. Hereinbelow, the air conditioner switch 110a, the refrigerant discharge pressure sensor 110b, and the alternator current sensor 110c will be referred to as "accessory load state sensors 110".

As is well known, the value of compressor torque can be used for determining a load state of the air conditioner 120. In this embodiment, since the compressor 121 of the air conditioner 120 is configured as a fixed displacement compressor, the refrigerant discharge pressure sensor 110b is provided in a refrigerant discharge path of the compressor 121 in order to use the value of compressor torque for that determination as described above. In this embodiment, a compressor torque is estimated based on a refrigerant flow rate calculated from a rotational speed of the compressor 121 (which is obtained from an engine rotational speed detected by the crank angle sensor 104) and a refrigerant discharge pressure detected by the refrigerant discharge pressure sensor 110b, thereby determining a load state of the air conditioner 120 from the estimated value of compressor torque. This configuration is only one example when the value of compressor torque is used for determining the load state of the air conditioner, and the present disclosure is not limited to such a configuration. In the case where a compressor of an air conditioner is a variable displacement compressor, it may, for example, be configured to directly measure a solenoid valve control current of a solenoid valve that controls the refrigerant discharge flow rate, and to estimate a compressor torque from that measured value. As is well known, since there is a correlation between the solenoid valve control current and the refrigerant discharge flow rate, it is possible to estimate the compressor torque from the solenoid valve control current.

With the configuration described above, the electronic control unit 100 performs control for suppressing the occurrence of rattling noise.

Figure 3:
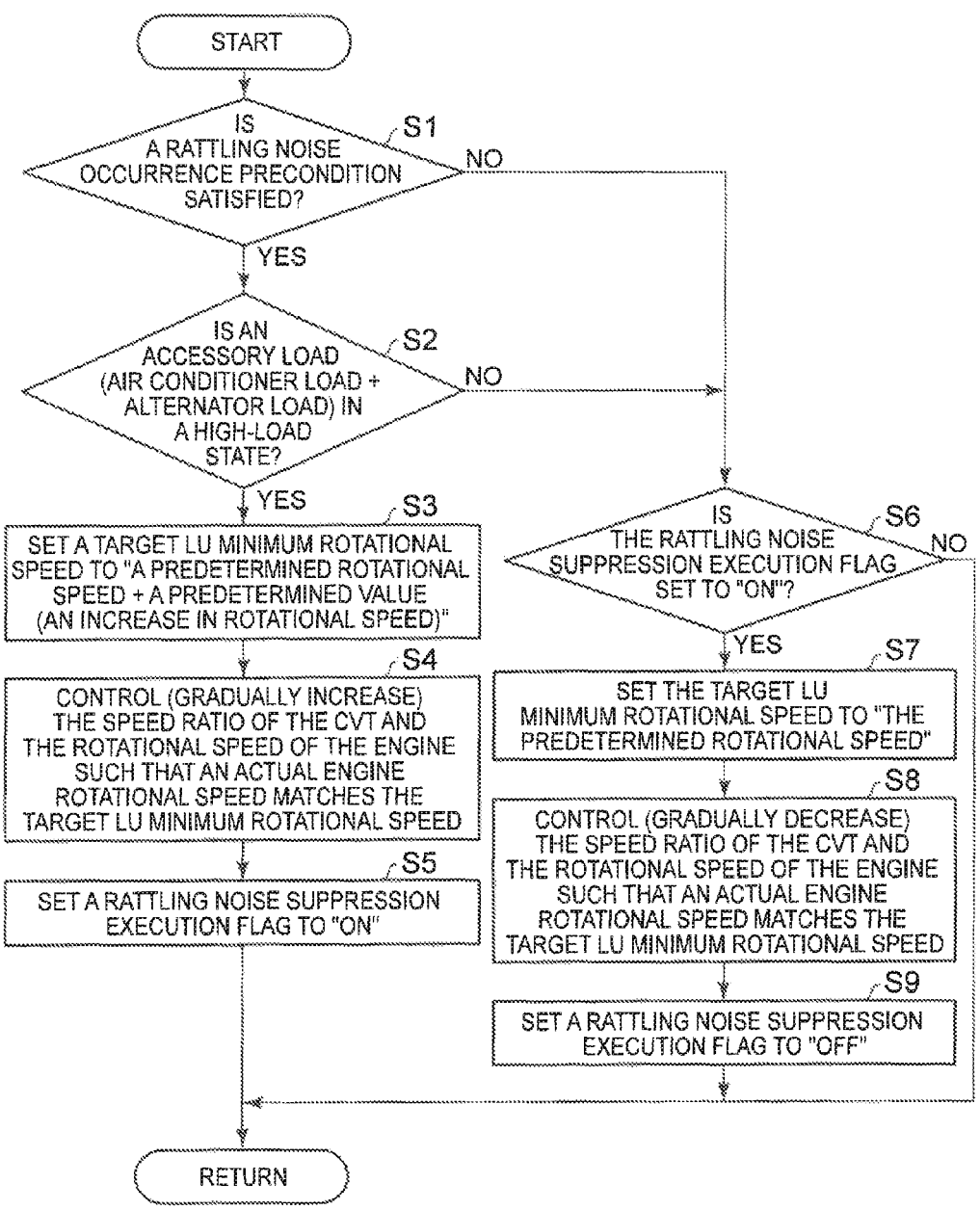
FIG. 3 is a flowchart for explaining rattling noise suppression control that is performed by the control device.

FIG. 3 is a flowchart for explaining the rattling noise suppression control that is performed by the electronic control unit 100. When the processing of the flowchart of FIG. 3 is started, the electronic control unit 100 determines at step S1 whether or not a rattling noise occurrence precondition is satisfied. Specifically, when the vehicle 1 is traveling at a low speed and is in the state where its driving force and its travel resistance are balanced, i.e. when the following conditions (1) to (6) are all established, the electronic control unit 100 determines that the rattling noise occurrence precondition is satisfied. <Rattling Noise Occurrence Precondition> (1) An acceleration of a vehicle is near zero. (|acceleration|≤predetermined acceleration) (2) An accelerator opening degree is less than or equal to a predetermined opening degree. (accelerator opening degree≤predetermined opening degree) (3) Engine rotation is low rotation. (predetermined engine rotational speed 1≤engine rotational speed Ne≤predetermined engine rotational speed 2) (4) A torque (C1 torque) of the forward clutch 37 is near 0 Nm. (|CVT input torque tt−friction Tcvtfric|≤predetermined torque) (5) Steady Traveling Determination Condition 1 (driving force/throttle opening degree≤predetermined value 1) (6) Steady Traveling Determination Condition 2 (Δ driving force/Δ throttle opening degree≤predetermined value 2) <Rattling Noise Occurrence Condition> (7) An accessory load (load by operation of air conditioner 120+ load by power generation of alternator 131) is a high load. (accessory load≥predetermined value 3) When the electronic control unit 100 has determined at step S1 that the rattling noise occurrence precondition is satisfied, the electronic control unit 100 proceeds to step S2 (YES side) and makes a determination on an accessory load state of the vehicle 1.

On the other hand, when the electronic control unit 100 has determined at step S1 that the rattling noise occurrence precondition is not satisfied, the electronic control unit 100 proceeds to step S6 (NO side) and makes a determination on a rattling noise suppression execution flag.

At step S2, the electronic control unit 100 makes a determination on the state of the accessory load of the vehicle 1 which is the rattling noise occurrence condition (7) described above, i.e. on the integrated state of the operating state and the load state of the air conditioner 120 mounted on the vehicle 1 and the load state of the alternator 131 mounted on the vehicle 1 (in this case, the electronic control unit 100 functions as a determination portion 100a). Specifically, the electronic control unit 100 determines the state of the accessory load of the vehicle 1 based on information detected by the accessory load state sensors 110. When the electronic control unit 100 has determined that the accessory load is in a high-load state (accessory load≥predetermined value 3), i.e. that the air conditioner 120 is operated and that "the sum of compressor torque (air conditioner load) and alternator load torque (alternator load)" indicative of an accessory load is greater than or equal to the predetermined value 3, the electronic control unit 100 proceeds to step S3 (YES side). In this case, since the engine 2 is in a state of being operated in a low-rotation medium-load range and the state of the vehicle 1 satisfies the rattling noise occurrence conditions ((1) to (6) described above), the electronic control unit 100 performs the rattling noise suppression control at step S3.

On the other hand, when the electronic control unit 100 has determined at step S2 that the air conditioner 120 is not operated (stopped state) or that while the air conditioner 120 is operated, the accessory load indicative of "air conditioner load+alternator load" is not in the high-load state, since the state of the vehicle 1 does not satisfy the rattling noise occurrence condition ((7) described above), the electronic control unit 100 proceeds to step S6 (NO side) and makes a determination on the rattling noise suppression execution flag. When the accessory load is not in the high-load state, the engine 2 is not operated in the low-rotation medium-load range, so that rattling noise does not occur. Therefore, in this case, in this embodiment, the electronic control unit 100 does not perform the rattling noise suppression control of steps S3 to S5 that increases the rotational speed of the engine 2, so that the fuel consumption of the vehicle is improved.

At step S3, the electronic control unit 100 performs the rattling noise suppression control. Specifically, in order to shift (deviate) the operating state of the engine 2 from the low-rotation medium-load range, the electronic control unit 100 controls the speed ratio of the CVT 40 such that the rotational speed of the engine 2 during engagement of the lock-up clutch 25 becomes higher than a predetermined rotational speed (in this case, the electronic control unit 100 functions as a second control portion 100c).

The electronic control unit 100 of the vehicle of this embodiment is configured such that when the lock-up clutch 25 is in an engaged state, the target value of engine rotational speed in the continuously variable transmission (CVT 40) can be set to a predetermined value as a "target LU minimum rotational speed". When the target LU minimum rotational speed has been set, the electronic control unit 100 is operated to control (the change of) the speed ratio of the CVT 40 such that the actual engine rotational speed matches the value (rotational speed) that is set as the target LU minimum rotational speed.

Therefore, the electronic control unit 100 sets the target LU minimum rotational speed to "a predetermined rotational speed+a predetermined value (an increase in rotational speed)". The predetermined rotational speed is a predetermined value (rotational speed) indicative of an engine rotational speed at which the electronic control unit 100 starts engaging the (released) lock-up clutch 25. By this setting, the speed ratio of the continuously variable transmission (CVT 40) and the rotational speed of the engine 2 are controlled such that the engine rotational speed during engagement of the lock-up clutch 25 becomes higher than the predetermined rotational speed so as to deviate the operating state of the engine 2 from the low-rotation medium-load range.

Then, the electronic control unit 100 proceeds to step S4.

At step S4, in response to the setting of the target LU minimum rotational speed, the electronic control unit 100 controls the speed ratio of the CVT 40 such that the actual engine rotational speed matches the target LU minimum rotational speed. In this event, the speed ratio of the CVT 40 is controlled (changed) to the shift-down side (the speed ratio increases) to increase the engine rotational speed, but if the engine rotational speed is rapidly increased by this control to the shift-down side, particularly when the lock-up clutch 25 is engaged, there is a possibility of the occurrence of shift shock due to the mass inertia of the engine 2. Therefore, in order to prevent the occurrence of shift shock, the electronic control unit 100 controls the speed ratio of the CVT 40 so as to gradually increase the actual engine rotational speed (gradual-change control) until the actual engine rotational speed reaches the target LU minimum rotational speed, thereby preventing the engine rotational speed from increasing rapidly (in this case, the electronic control unit 100 functions as the second control portion 100c). Hereinbelow, this will be referred to as "gradual increase".

Herein, the gradual-change control will be specifically described. The electronic control unit 100 obtains a difference between the target LU minimum rotational speed and an actual engine rotational speed and sets this difference in rotational speed as a target difference rotational speed. Then, based on the map data pre-stored in the ROM, the electronic control unit 100 determines a gradual-change time from the target difference rotational speed. In the map data, a control time (gradual-change time) necessary for increasing or decreasing (lowering) an actual engine rotational speed by a target difference rotational speed in such a way as to allow the change rate of the actual engine rotational speed to fall within a predetermined range that does not cause shift shock in gradual-change control is determined in advance. For example, when a target difference rotational speed is 300 rpm, the electronic control unit 100 searches the map data using 300 rpm as a parameter, so that 3 sec (seconds) corresponding to that target difference rotational speed is determined as a gradual-change time from the map data. Then, the electronic control unit 100 performs gradual-change control of the speed ratio of the CVT 40 for that gradual-change time such that the actual engine rotational speed gradually reaches the target LU minimum rotational speed. In the case of the example described above, the electronic control unit 100 performs, for 3 seconds, speed-ratio control of the CVT 40 that increases the actual engine rotational speed by 100 rpm per second (gradually), i.e. 300 rpm/3 sec="100 rpm/sec". The gradual-change control is performed in this way.

In parallel to the control of the speed ratio of the CVT 40 described above, the electronic control unit 100 controls the rotational speed of the engine 2. Specifically, the electronic control unit 100 controls the fuel injection amount or the opening degree of the throttle valve in the engine 2, thereby performing gradual-change control similar to the gradual increase described above such that the output rotational speed of the engine 2 matches the target LU minimum rotational speed.

In this embodiment, by the control performed by the electronic control unit 100 as described above, the operating state of the engine 2 is shifted (deviated) from the low-rotation medium-load range, so that the occurrence of rattling noise is suppressed.

Then, the electronic control unit 100 proceeds to step S5.

At step S5, the electronic control unit 100 sets the rattling noise suppression execution flag, indicating that the rattling noise suppression control has been performed, to "ON". The rattling noise suppression execution flag is set to "OFF" until it is set to "ON" at step S5.

When the rattling noise suppression control has been finished, the electronic control unit 100 ends this routine.

At step S6, the electronic control unit 100 makes a determination on the rattling noise suppression execution flag. Step S6 is a step that is executed when the state of the vehicle 1 does not satisfy one or more of the rattling noise occurrence conditions. In this case, since the vehicle 1 is in the state where rattling noise does not occur, when the rattling noise suppression execution flag is set to "ON", i.e. the rattling noise suppression control has been performed, as a result of making the determination on the rattling noise suppression execution flag, the electronic control unit 100 performs control to release the rattling noise suppression control.

That is, when the electronic control unit 100 has determined at step S6 that the rattling noise suppression execution flag is set to "ON", the electronic control unit 100 proceeds to step S7 (YES side) and performs control for releasing the rattling noise suppression control.

On the other hand, when the electronic control unit 100 has determined at step S6 that the rattling noise suppression execution flag is set to "OFF", the electronic control unit 100 ends this routine (NO side).

At step S7, the electronic control unit 100 performs the control for releasing the rattling noise suppression control. The electronic control unit 100 sets the target LU minimum rotational speed to "the predetermined rotational speed". As described above, the predetermined rotational speed is a predetermined value (rotational speed) indicative of an engine rotational speed at which the electronic control unit 100 starts engaging the (released) lock-up clutch 25. By this setting, the speed ratio of the continuously variable transmission (CVT 40) and the rotational speed of the engine 2 are controlled such that the engine rotational speed during engagement of the lock-up clutch 25 is kept at the predetermined rotational speed that should maintain the engaged state of the lock-up clutch 25 (in this case, the electronic control unit 100 functions as a first control portion 100b).

Then, the electronic control unit 100 proceeds to step S8.

At step S8, in response to the setting of the target LU minimum rotational speed, the electronic control unit 100 controls the speed ratio of the CVT 40 such that the actual engine rotational speed matches the target LU minimum rotational speed. In this event, the speed ratio of the CVT 40 is controlled (changed) to the shift-up side (the speed ratio decreases) to decrease (lower) the engine rotational speed, but if the engine rotational speed is rapidly decreased by this control to the shift-up side, particularly when the lock-up clutch 25 is engaged, there is a possibility of the occurrence of shift shock due to the mass inertia of the engine 2. Therefore, in order to prevent the occurrence of shift shock, the electronic control unit 100 controls the speed ratio of the CVT 40 so as to gradually decrease (lower) the actual engine rotational speed (gradual-change control) until the actual engine rotational speed reaches the target LU minimum rotational speed, thereby preventing the engine rotational speed from decreasing rapidly (in this case, the electronic control unit 100 functions as the first control portion 100b). Hereinbelow, this will be referred to as "gradual decrease".

In parallel to the control of the speed ratio of the CVT 40 described above, the electronic control unit 100 controls the rotational speed of the engine 2. Specifically, the electronic control unit 100 controls the fuel injection amount or the opening degree of the throttle valve in the engine 2, thereby performing gradual-change control similar to the gradual decrease described above such that the output rotational speed of the engine 2 matches the target LU minimum rotational speed.

Then, the electronic control unit 100 proceeds to step S9.

At step S9, the electronic control unit 100 sets the rattling noise suppression execution flag, indicating that the rattling noise suppression control has been performed, to "OFF".

When the control for releasing the rattling noise suppression control has been finished, the electronic control unit 100 ends this routine.

As described above, in the vehicle 1 of this embodiment, when the electronic control unit 100 has determined that the rattling noise occurrence precondition is satisfied, i.e. when the vehicle 1 is traveling at a low speed and is in the state where its driving force and its travel resistance are balanced, the electronic control unit 100 makes a determination on the state of the accessory load of the vehicle 1, i.e. on the integrated state of the operating state and the load state of the air conditioner 120 mounted on the vehicle 1 and the load state of the alternator 131 mounted on the vehicle 1. When the electronic control unit 100 has determined that the accessory load is in the high-load state, i.e. that the air conditioner 120 is operated and that "the sum of compressor torque (air conditioner load) and alternator load torque (alternator load)" indicative of the accessory load is greater than or equal to the predetermined value 3, since the engine 2 is in the state of being operated in the low-rotation medium-load range, the electronic control unit 100 performs the rattling noise suppression control. Specifically, the electronic control unit 100 controls the speed ratio of the CVT 40 and the rotational speed of the engine 2 such that the engine rotational speed during engagement of the lock-up clutch 25 becomes "a predetermined rotational speed+a predetermined value (an increase in rotational speed)=a second rotational speed" which is higher than "the predetermined rotational speed=a first rotational speed". By this control, in the vehicle 1 of this embodiment, the operating state of the engine 2 is shifted (deviated) from the low-rotation medium-load range, so that the occurrence of rattling noise is suppressed.

Further, in the control of the speed ratio of the CVT 40 and the rotational speed of the engine 2 in this case, the electronic control unit 100 gradually increases the engine rotational speed by the gradual-change control, so that shift shock due to the mass inertia of the engine 2 does not occur when increasing the engine rotational speed.

In the vehicle 1 of this embodiment, in the determination on the state of the accessory load of the vehicle 1, i.e. on the integrated state of the operating state and the load state of the air conditioner 120 and the load state of the alternator 131, when the electronic control unit 100 has determined that the air conditioner 120 is not operated (stopped state) or that while the air conditioner 120 is operated, the accessory load indicative of "air conditioner load+alternator load" is not in the high-load state, the electronic control unit 100 does not perform the rattling noise suppression control. In this case, the state of the vehicle 1 does not satisfy the rattling noise occurrence condition ((7) described above), i.e. the accessory load indicative of "load by the operation of the air conditioner 120+load by the power generation of the alternator 131" is not in the high-load state, and therefore, the engine 2 is not operated in the low-rotation medium-load range, so that rattling noise does not occur. That is, in this case, it is not necessary to perform the rattling noise suppression control. Therefore, in this case, since the electronic control unit 100 does not perform the rattling noise suppression control that increases the rotational speed of the engine 2, the fuel consumption of the vehicle 1 is improved.

In the vehicle 1 of this embodiment, after the electronic control unit 100 has performed the rattling noise suppression control, the electronic control unit 100 performs the control to release the rattling noise suppression control when the state of the vehicle 1 does not satisfy one or more of the rattling noise occurrence conditions, i.e. when the vehicle 1 is in the state where rattling noise does not occur. Specifically, the electronic control unit 100 controls the speed ratio of the CVT 40 and the rotational speed of the engine 2 such that the engine rotational speed during engagement of the lock-up clutch 25 is kept at "the predetermined rotational speed=the first rotational speed". As described above, the predetermined rotational speed is a predetermined value (rotational speed) indicative of an engine rotational speed at which the electronic control unit 100 starts engaging the (released) lock-up clutch 25. That is, in this case, the speed ratio of the CVT 40 and the rotational speed of the engine 2 are controlled such that the engine rotational speed is kept at the predetermined rotational speed that should maintain the engaged state of the lock-up clutch 25.

Further, in the control of the speed ratio of the CVT 40 and the rotational speed of the engine 2 in this case, the electronic control unit 100 gradually decreases the engine rotational speed by the gradual-change control, so that shift shock due to the mass inertia of the engine 2 does not occur when decreasing (lowering) the engine rotational speed.

As described above, according to the electronic control unit 100 installed in the vehicle 1 of this embodiment, not only the occurrence of rattling noise is suppressed, but also the fuel consumption of the vehicle is improved.

The determination on the load state of the air conditioner at step S2 described above can be made as follows depending on the operating state switching function of the air conditioner. For example, when the vehicle is provided with an air conditioner that can switch its operating mode by an operating mode switch between "a high-load mode" in which the accessory load by the operation of the air conditioner becomes greater than or equal to the predetermined value 3, and "a low-load mode" in which the accessory load becomes less than the predetermined value 3, it may be configured to detect the selection state of the operating mode switch by a driver or the like, thereby determining the load state of the air conditioner based on the detection result. Even when there are more than two selectable operating modes, such as "a high-load mode", "a medium-load mode", and "a low-load mode", it may be configured to perform the rattling noise suppression control of step S3 only when the accessory load by the operation of the air conditioner in the selected operating mode becomes greater than or equal to the predetermined value 3.

What is claimed is:

1. A control device for a vehicle, the vehicle including an engine, an accessory, a continuously variable transmission, and a lock-up clutch, the control device comprising:
    an electronic control unit configured to:
    control a speed ratio of the continuously variable transmission and a rotational speed of the engine;
    determine a load state of the accessory;
    when the load state is less than a predetermined value, control the speed ratio of the continuously variable transmission and the rotational speed of the engine such that the rotational speed of the engine during engagement of the lock-up clutch is kept at a first rotational speed; and
    when the load state is greater than or equal to the predetermined value, control the speed ratio of the continuously variable transmission and the rotational speed of the engine such that the rotational speed of the engine during engagement of the lock-up clutch becomes a second rotational speed higher than the first rotational speed, thereby shifting an operating state of the engine to an operating state outside a low-rotation medium-load range.

2. The control device according to claim 1, wherein the electronic control unit is configured to, when the load state has shifted between less than the predetermined value and greater than or equal to the predetermined value, control the speed ratio of the continuously variable transmission and the rotational speed of the engine such that a change rate of the rotational speed of the engine is suppressed within a predetermined range.

* * * * *